(12) United States Patent
Sharma

(10) Patent No.: US 12,134,305 B2
(45) Date of Patent: Nov. 5, 2024

(54) AIR FILTRATION SYSTEM AND METHOD

(71) Applicant: GM Global Technology Operations LLC, Detroit, MI (US)

(72) Inventor: Vikas Bhu Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 583 days.

(21) Appl. No.: 17/522,204

(22) Filed: Nov. 9, 2021

(65) Prior Publication Data
US 2023/0143870 A1    May 11, 2023

(51) Int. Cl.
*B60H 3/06* (2006.01)
*B01D 46/10* (2006.01)
*B01D 46/62* (2022.01)
*B01D 46/70* (2022.01)

(52) U.S. Cl.
CPC .......... *B60H 3/0658* (2013.01); *B01D 46/10* (2013.01); *B01D 46/62* (2022.01); *B01D 46/70* (2022.01); *B60H 3/0633* (2013.01); *B01D 2201/202* (2013.01); *B01D 2279/40* (2013.01); *B01D 2279/65* (2013.01)

(58) Field of Classification Search
CPC ................ B01D 46/4272; B01D 46/62; B01D 2279/65; B01D 46/70; B01D 46/10; B60H 3/0658; A62B 23/02
See application file for complete search history.

(56) References Cited

U.S. PATENT DOCUMENTS

| | | | |
|---|---|---|---|
| 4,048,911 A * | 9/1977 | Petersen | F24F 7/025 454/158 |
| 2021/0275955 A1* | 9/2021 | Stiehler | B01D 46/64 |
| 2021/0347229 A1* | 11/2021 | Lee | B60H 1/00671 |

FOREIGN PATENT DOCUMENTS

KR       101944498 B1 *  1/2019

* cited by examiner

*Primary Examiner* — Robert Clemente
(74) *Attorney, Agent, or Firm* — Vivacqua Crane, PLLC

(57) ABSTRACT

A system for providing filtered air to an enclosed space includes a first air feed pump to pull air from an environment and push pressurized air to the enclosed space, a power source adapted to provide electrical power to the first air feed pump, a first filter media positioned between the first air feed pump and the enclosed space to provide coarse filtration of the pressurized air pumped from the first air feed pump through the first filter media and remove particles that are larger than approximately 5 microns, and a second filter media positioned between the first filter media and the enclosed space to provide fine filtration of the pressurized air pumped from the first filter media through the second filter media and remove particles that are between 1 nanometer and 20 nanometers in size.

20 Claims, 3 Drawing Sheets

AIR FILTRATION SYSTEM AND METHOD

INTRODUCTION

The present disclosure relates to a system and method of filtering air for human breathing. Current filtration systems only provide filtration of particles larger than 300 nanometers. Viruses are smaller than this, and are not filtered by current breathing filters.

High efficiency particulate air (HEPA) filters and KN95 masks only capture particles that are 300 nanometers or larger in size, and, KN95 masks are only 95% effective. Ultralow particulate air filters (ULFA) filters only capture particles that are 120 nanometers or larger in size. Pollutants and viruses are much smaller than this, as consequently, pass through HEPA and ULFA filters.

Thus, while current filtration systems and methods of filtering air achieve their intended purpose, there is a need for a new and improved system and method for filtering air that captures particulates that are as small as 1 nanometer.

SUMMARY

According to several aspects of the present disclosure, a system for providing filtered air to an enclosed space includes a first air feed pump adapted to pull air from an exterior environment and push pressurized air through the system to the enclosed space, a power source adapted to provide electrical power to the first air feed pump, a first filter media positioned between the first air feed pump and the enclosed space, downstream of the first air feed pump, the first filter media adapted to provide coarse filtration of the pressurized air pumped from the first air feed pump through the first filter media, and a second filter media positioned between the first filter media and the enclosed space, downstream of the first filter media, the second filter media adapted to provide fine filtration of the pressurized air pumped from the first filter media through the second filter media.

According to another aspect, the system further includes a first control valve positioned between the first air feed pump and the first filter media, downstream of the first air feed pump, the first control valve being adapted to control the flow of pressurized air from the first air feed pump.

According to another aspect, the first filter media is adapted to remove particles that are larger than approximately 5 microns from the pressurized air flowing through the first filter media.

According to another aspect, the second filter media is adapted to remove particles that are between approximately 1 nanometer and approximately 20 nanometers in size from the pressurized air flowing through the second filter media.

According to another aspect, the enclosed space is a facemask adapted to deliver air that has passed through the first filter media and the second filter media to an individual user. Such facemasks exist and are used, for example, in the healthcare industry.

According to another aspect, the power source is adapted to provide between approximately 20 and approximately 32 watts of power to the first air feed pump and the first air feed pump is adapted to provide air that is pressured to between approximately 1 psi and approximately 3 psi to the facemask at a flow rate of between approximately 30 liters per minute and approximately 60 liters per minute.

According to another aspect, the enclosed space is a vehicle compartment.

According to another aspect, the system further includes a first reversing control valve positioned between the second filter media and the enclosed space, a reverse air flow path extending between and interconnecting the first control valve to the first reversing control valve, and a second reverse control valve positioned between the first control valve and the first filter media, wherein, the first control valve is selectively actuatable to divert pressurized air flow from the first air feed pump to the reverse air flow path, the first reversing control valve is selectively actuatable to stop air flow to the enclosed space and divert air flow from the reverse air flow path through the second filter media and the first filter media, and the second reverse control valve is selectively actuatable to divert pressurized air flow passing through the first filter media to the environment, wherein, when pressurized air flows through the first and second filter media from the reverse air flow path, the pressurized air dislodges particles captured by the first and second filter media and expels the particles dislodged from the first and second filter media out of the system to the exterior environment through the second reverse control valve.

According to another aspect, the system further includes a second air feed pump adapted to pull air from the enclosed space and push pressurized air through the system to the exterior environment, and a third filter media positioned between the second air feed pump and the exterior environment, downstream of the second air feed pump, the third filter media adapted to provide fine filtration of the pressurized air pumped from the second air feed pump through the third filter media.

According to another aspect, the system further includes a second control valve positioned between the second air feed pump and the third filter media, downstream of the second air feed pump, the second control valve being adapted to control the flow of pressurized air from the second air feed pump.

According to another aspect, the third filter media is adapted to remove particles that are between approximately 1 nanometer and approximately 20 nanometers in size from the pressurized air flowing through the third filter media.

According to another aspect, the system further includes a fourth filter media positioned between the second air feed pump and the third filter media, downstream of the second air feed pump, the fourth filter media adapted to provide coarse filtration of the pressurized air pumped from the second air feed pump through the fourth filter media before the pressurized air passes through the third filter media.

According to another aspect, the fourth filter media is adapted to remove particles that are larger than 5 microns from the pressurized air flowing through the fourth filter media.

According to several aspects of the present disclosure, a method of providing filtered air to an enclosed space includes providing, with a power source, electrical power to a first air feed pump, pulling, with the first air feed pump, air from an exterior environment and pushing, with the first air feed pump, pressurized air to the enclosed space, providing, with a first filter media positioned between the first air feed pump and the enclosed space, downstream of the first air feed pump, coarse filtration of the pressurized air pumped from the first air feed pump through the first filter media and removing, with the first filter media, particles that are larger than approximately 5 microns from the pressurized air, and providing, with a second filter media positioned between the first filter media and the enclosed space, downstream of the first filter media, fine filtration of the pressurized air pumped from the first filter media through the second filter media and removing, with the second filter media, particles that are between approximately 1 nanometer and approximately 20 nanometers in size from the pressurized air.

According to another aspect, the providing, with the power source, electrical power to the first air feed pump further includes providing, with the power source, between approximately 20 and approximately 32 watts of power to the first air feed pump, and the pushing, with the first air feed pump, pressurized air to the enclosed space further includes pushing, with the first air feed pump, air that is pressured to between approximately 1 psi and approximately 3 psi to the enclosed space at a flow rate of between approximately 30 liters per minute and approximately 60 liters per minute.

According to another aspect, the method further includes pulling, with a second air feed pump, air from the enclosed space and pushing, with the second air feed pump, pressurized air to the exterior environment, and providing, with a third filter media positioned between the second air feed pump and the exterior environment, downstream of the second air feed pump, fine filtration of the pressurized air pumped from the second air feed pump through the third filter media and removing, with the third filter media, particles that are between approximately 1 nanometer and approximately 20 nanometers in size from the pressurized air.

According to another aspect, the method further includes providing, with a fourth filter media positioned between the second air feed pump and the third filter media, downstream of the second air feed pump, coarse filtration of the pressurized air pumped from the second air feed pump through the fourth filter media and removing, with the fourth filter media, particles that are larger than 5 microns from the pressurized air before the pressurized air passes through the third filter media.

According to another aspect, the system further includes a first reversing control valve positioned between the second filter media and the enclosed space, a reverse air flow path extending between and interconnecting the first control valve to the first reversing control valve, and a second reverse control valve positioned between the first control valve and the first filter media, the method further includes diverting, with the first control valve, pressurized air flow from the first air feed pump to the reverse air flow path, stopping, with the first reversing control valve, air flow to the enclosed space and diverting air flow from the reverse air flow path through the second filter media and the first filter media and dislodging particles captured by the first and second filter media, and diverting, with the second reverse control valve, pressurized air flow passing through the first filter media to the environment and expelling particles dislodged from the first and second filter media out of the system to the exterior environment.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
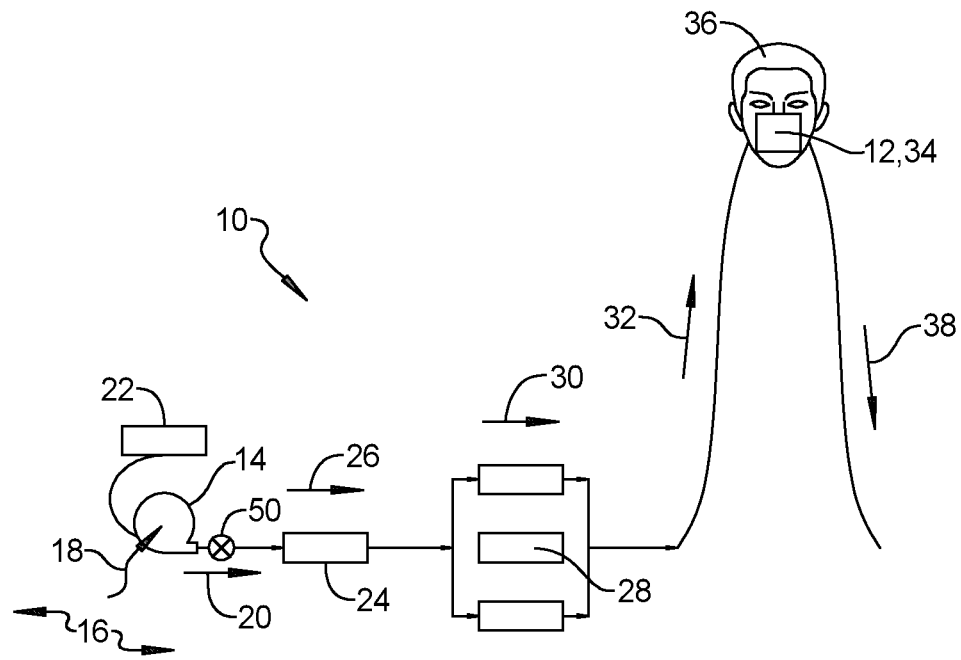
FIG. 1 is a schematic view of a system for providing filtered air to an enclosed space, wherein the enclosed space is a face mask, according to an exemplary embodiment.

Referring to FIG. 1, a system 10 for providing filtered air to an enclosed space 12 includes, a first air feed pump 14 that is adapted to pull air from an exterior environment 16, as indicate by arrow 18, and push pressurized air through the system 10 to the enclosed space 12, as indicated by arrow 20. A power source 22 is adapted to provide electrical power to the first air feed pump 14. A first filter media 24 is positioned between the first air feed pump 14 and the enclosed space 12, downstream of the first air feed pump 14. The first filter media 24 is adapted to provide coarse filtration of the pressurized air pumped from the first air feed pump 14 through the first filter media 24, as indicated by arrow 26. A second filter media 28 is positioned between the first filter media 24 and the enclosed space 12, downstream of the first filter media 24. The second filter media 28 is adapted to provide fine filtration of the pressurized air pumped from the first filter media 24 through the second filter media 28, as indicated by arrow 30. From the second filter media 28, the filtered air is pushed to the enclosed space 12, as indicated by arrow 32.

As shown in FIG. 1, in one exemplary embodiment, the enclosed space 12 is a facemask 34 adapted to deliver air that has passed through the first filter media 24 and the second filter media 28 to an individual user 36. For providing breathing air to a face mask 34 for an individual user 36, the power source 22 is adapted to provide between approximately 20 and approximately 32 watts of power to the first air feed pump 14 and the first air feed pump 14 is adapted to provide air that is pressured to between approximately 1 psi and approximately 3 psi to the face mask 34. Air that is expelled by the individual 36 into the face mask 34 is routed out of the system 10, as indicated by arrow 38. To support breathing for an individual 36, the first air feed pump 14 must deliver air to the face mask 34 at a flow rate of between approximately 30 liters per minute and approximately 60 liters per minute. Because the power consumption of the power source 22 is relatively low, between approximately 20 and 32 watts of power, the power source 22 could be a rechargeable battery pack, thus enabling the system 10 to be portable.

Figure 2:
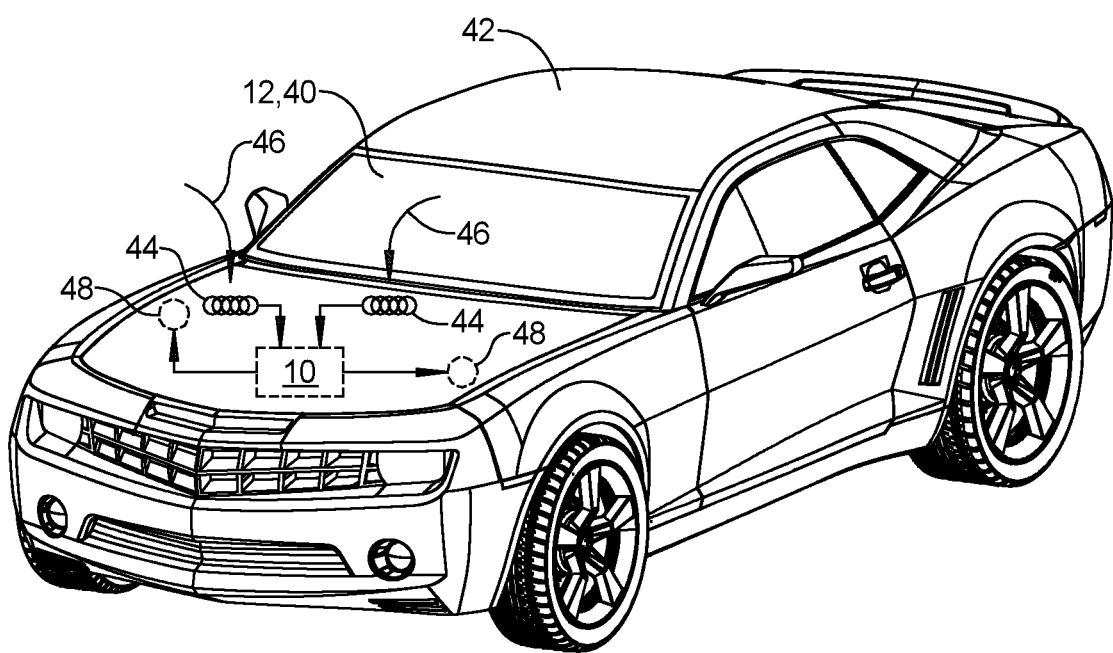
FIG. 2 is a schematic view of a system for providing filtered air to an enclosed space, wherein the enclosed space is a vehicle compartment, according to an exemplary embodiment.

Referring to FIG. 2, in another exemplary embodiment, the enclosed space 12 is a vehicle compartment 40. The first feed pump 14 of the system 10 draws air in from outside a vehicle 42 through inlets 44, as indicated by arrows 46, and pushes filtered air from the system 10 to the interior vehicle compartment 40 through air vents 48 within the vehicle 42. The system 10 can incorporate a first feed pump 14 capable of providing increased flow rate so the system 10 can feed filtered air to the entire interior vehicle compartment 40, thus providing filtered air to all of the passengers in the vehicle 42 with an HVAC system operating in recirculation mode. Likewise the system 10 can be adopted to provide filtered air directly to the face mask 34 of the passenger 36 in the vehicle 42 making it independent of the HVAC system operation and hence reducing it's capacity requirements. Likewise the system 10 can be adapted to provide personal protection space to seated aircraft passengers and similarly to healthcare workers and patients. Likewise, the system 10 could be adapted to provide filtered air to a larger enclosed space 12, such as a room, or an entire building. If the system 10 is designed for a relatively large enclosed space, such as a large room or an entire building, such as a home, the system 10 can be designed with larger second filter media 28, or multiple second filter media 28, positioned in parallel, to provide adequate air flow with a conservatively sized first air feed pump 14.

Referring again to FIG. 1, in another exemplary embodiment, a first control valve 50 is positioned between the first air feed pump 14 and the first filter media 24, downstream of the first air feed pump 14. The first control valve 50 is adapted to control the flow of pressurized air from the first air feed pump 14.

The first filter media 24 provides coarse "microfiltration" and is adapted to remove particles that are larger than approximately 5 microns from the pressurized air flowing through the first filter media 24. The first filter media 24 will capture larger particles of pollution such as dust and dirt. As shown, the first filter media 24 is positioned downstream of the first air feed pump 14. It should be understood that the first filter media 24 may also be positioned upstream of the first air feed pump 14, such as at an inlet to the first air feed pump 14 without departing from the spirit of the present disclosure. Such filter materials exist and are used, for example, in air and water purification processes.

The second filter media 28 is a membrane that provides fine "ultrafiltration" and is adapted to remove particles that are between approximately 1 nanometer and approximately 20 nanometers in size from the pressurized air flowing through the second filter media 28. Such membrane materials exist and are used, for example, in water purification processes. Such membrane materials have not been used for air filtration due to the resistance they impart to air flowing through them. A human being would be unable to draw air through a membrane of such a material, thus the first feed pump 14 is necessary to push the air through the second filter media 28 to the enclosed space 12.

The power requirements of the first air feed pump 14 are directly related to the resistance of the air flowing through the second filter media 28, thus, if filtration requirements are less stringent a smaller or less powerful first air feed pump 14 that uses less power can be used. For example, if the system 10 is only required to filter particles that are 30 nanometers or larger in size, the system can be designed with a second filter media 28 membrane that provides less resistance to air flow than a second filter media 28 membrane that would capture particles that are 1 nanometer or larger in size, thus requiring less air pressure to push the air through the second filter media and a smaller, less power consuming, first air feed pump. This allows the system to be customized for specific filtration needs to optimize power consumption.

Figure 3:
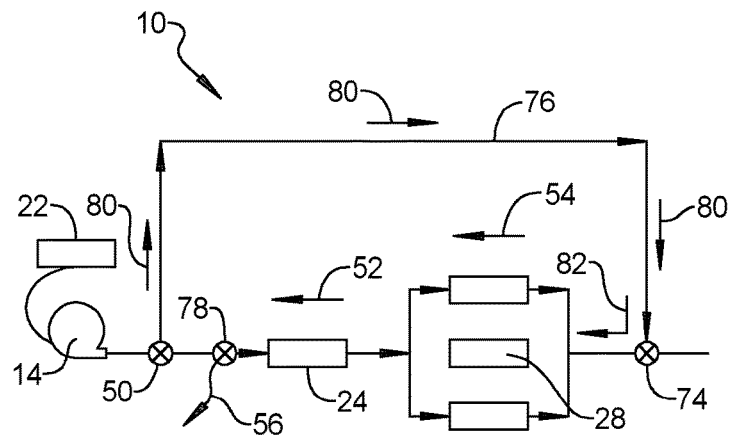
FIG. 3 is a schematic view of the system of FIG. 1, wherein the pressurized air flow through the first and second filter media is reversed.

Referring to FIG. 3, in an exemplary embodiment, the system 10 further includes a first reversing control valve 74 positioned between the second filter media 28 and the enclosed space 12, a reverse air flow path 76 extending between and interconnecting the first control valve 50 to the first reversing control valve 74, and a second reverse control valve 78 positioned between the first control valve 50 and the first filter media 24. The first control valve 50 is selectively actuatable to divert pressurized air flow from the first air feed pump 14 to the reverse air flow path 76, as indicated by arrows 80. The first reversing control valve 74 is selectively actuatable to stop air flow to the enclosed space 12 and divert air flow from the reverse air flow path 76, as indicated by arrow 82, through the second filter media 28, as indicated by arrow 54, and through the first filter media 24, as indicated by arrow 52. The second reverse control valve 78 is selectively actuatable to divert pressurized air flow passing through the first filter media 24 to the environment, as indicated by arrow 56. When pressurized air flows through the second and first filter media 28, 24 from the reverse air flow path 76, the pressurized air dislodges particles captured by the first and second filter media 24, 28 and expels the dislodged particles out of the system 10 to the exterior environment through the second reverse control valve 78. Alternatively, when pressurized air flows through the second and first filter media 28, 24 from the reverse air flow path 76, the pressurized air dislodges particles captured by the first and second filter media 24, 28 and the system 10 shakes and drops the dislodged particles inside a chamber surrounding the first and second filter media 24, 28.

Figure 4:
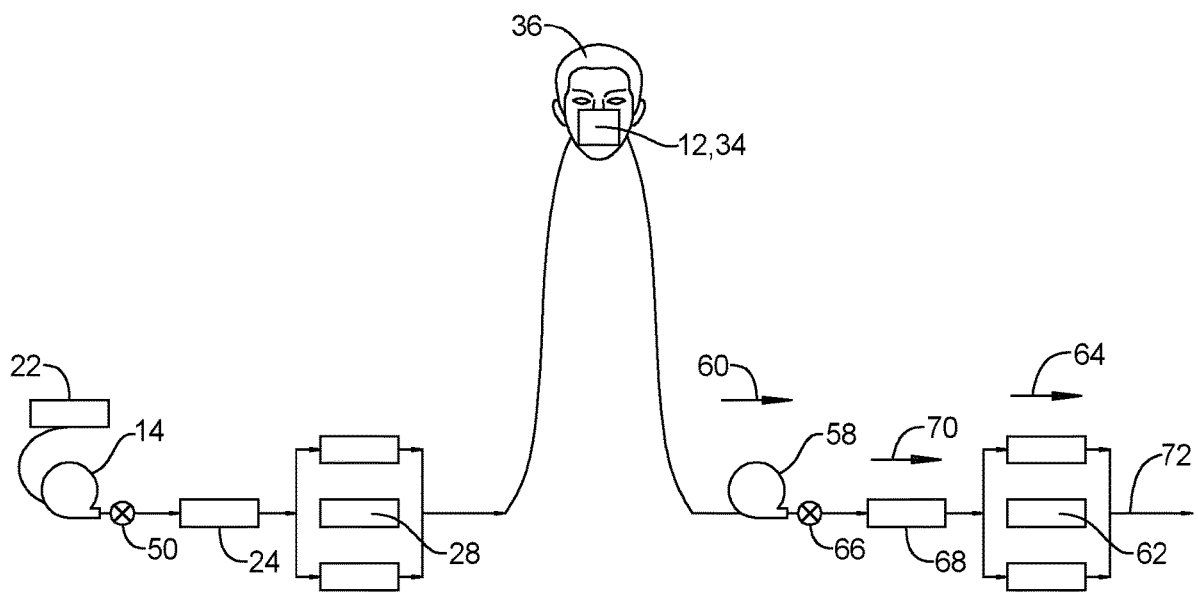
FIG. 4 is a schematic view of the system shown in FIG. 1 wherein air is filtered before being expelled to the environment from the enclosed space.

Referring to FIG. 4, in another exemplary embodiment, the system 10 further includes a second air feed pump 58 adapted to pull air from the enclosed space 12 and push pressurized air through the system 10 to the exterior environment 16, as indicated by arrow 60. A third filter media 62 is positioned between the second air feed pump 58 and the exterior environment 16, downstream of the second air feed pump 58. The third filter media 62 is a membrane, similar to the second filter media 28, that is adapted to provide fine filtration and remove particles that are between approximately 1 nanometer and approximately 20 nanometers in size from the pressurized air flowing through the third filter media 62, as indicated by arrow 64. A human being would be unable to push air through a membrane of such a material, thus the second air feed pump 58 is necessary to push the air through the third filter media 62 to the environment 16.

According to another exemplary embodiment, the system 10 may include a second control valve 66 positioned between the second air feed pump 58 and the third filter media 62, downstream of the second air feed pump 58. The second control valve 66 being adapted to control the flow of pressurized air from the second air feed pump 58.

In yet another exemplary embodiment, the system 10 includes a fourth filter media 68 positioned between the second air feed pump 58 and the third filter media 62, downstream of the second air feed pump 58. The fourth filter media 68, like the first filter media 24, is adapted to remove particles that are larger than approximately 5 microns from the pressurized air flowing through the fourth filter media 68, as indicated by arrow 70. The fourth filter media 68 will provide coarse filtration of the air and capture larger particles of pollution before the air gets to the third filter media 62. The third and fourth filter media 62, 68 will ensure that small particles, such as viruses, are removed from the air expelled by an individual 36 using the system 10 before such air is released back to the environment 16, as indicated by arrow 72, helping to prevent spread of such viruses.

Figure 5:
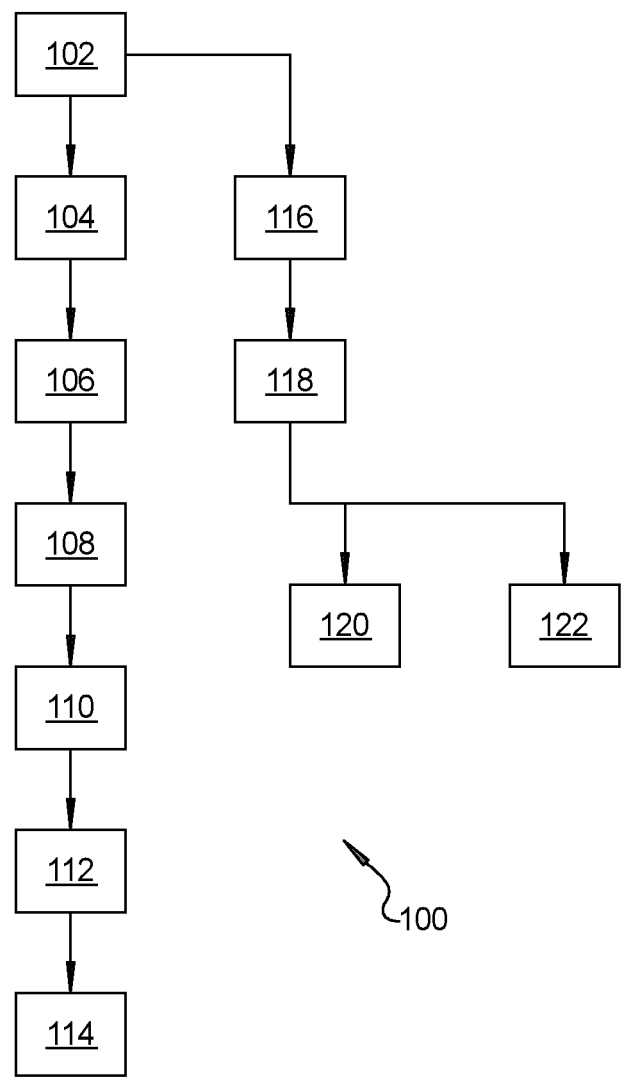
FIG. 5 is a flowchart illustrating a method of providing filtered air to an enclosed space according to an exemplary embodiment.

Referring to FIG. 5, a method 100 of providing filtered air to an enclosed space 12 with a system 10 according to the present disclosure is shown schematically. Beginning at block 102, the method includes providing, with the power source 22, electrical power to the first air feed pump 14. Moving to block 104, the method 100 includes pulling air, with the first air feed pump 14, from the exterior environment and pushing, with the first air feed pump 14, pressurized air to the enclosed space 12, as shown by arrows 18 and 20 in FIG. 1.

Moving to block 106, the method includes providing, with the first filter media 24 that is positioned between the first air feed pump 14 and the enclosed space 12, downstream of the first air feed pump 14, coarse filtration of the pressurized air pumped from the first air feed pump 14 through the first filter media 24, as indicated by arrow 26 in FIG. 1, and removing, with the first filter media 24, particles that are larger than approximately 5 microns from the pressurized air.

Moving to block 108, the method 100 includes providing, with the second filter media 28 that is positioned between the first filter media 24 and the enclosed space 12, downstream of the first filter media 24, fine filtration of the pressurized air pumped from the first filter media 24 through the second filter media 28, as indicated by arrow 30 in FIG. 1, and removing, with the second filter media 28, particles that are between approximately 1 nanometer and approximately 20 nanometers in size from the pressurized air.

In an exemplary embodiment, the providing, with the power source 22, electrical power to the first air feed pump 14 further includes providing, with the power source 22, between approximately 20 and approximately 32 watts of power to the first air feed pump 14. Additionally, the pushing, with the first air feed pump 14, pressurized air to the enclosed space 12 further includes pushing, with the first air feed pump 22, air that is pressured to between approximately 1 psi and approximately 3 psi to the enclosed space 12 at a flow rate of between approximately 30 liters per minute and approximately 60 liters per minute.

Moving to block 110, in an exemplary embodiment, the method 100 further includes pulling, with the second air feed pump 58, air from the enclosed space 12 and pushing, with the second air feed pump 58, pressurized air to the exterior environment 16, as indicated by arrow 60 in FIG. 4.

Moving to block 112, the method 100 includes providing, with the third filter media 62 that is positioned between the second air feed pump 58 and the exterior environment 16, downstream of the second air feed pump 58, fine filtration of the pressurized air pumped from the second air feed pump 58 through the third filter media 62, as indicated by arrow 64 in FIG. 4, and removing, with the third filter media 62, particles that are between approximately 1 nanometer and approximately 20 nanometers in size from the pressurized air.

Moving to block 114, in an exemplary embodiment, the method 100 further includes providing, with the fourth filter media 68 that is positioned between the second air feed pump 58 and the third filter media 62, downstream of the second air feed pump 58, coarse filtration of the pressurized air pumped from the second air feed pump 58 through the fourth filter media 68, as indicated by arrow 70 in FIG. 4, and removing, with the fourth filter media 68, particles that are larger than 5 microns from the pressurized air before the pressurized air passes through the third filter media 62.

Moving from block 102 to block 116, in another exemplary embodiment, the method 100 includes diverting, with the first control valve 50, pressurized air flow from the first air feed pump 14 to the reverse air flow path 76, as shown by arrows 80 in FIG. 3. Moving to block 118, the method 100 includes stopping, with the first reversing control valve 74, air flow to the enclosed space 12 and diverting air flow from the reverse air flow path 76, as shown by arrow 82 in FIG. 3, through the second filter media 28, as indicated by arrow 54 in FIG. 3 and the first filter media 24, as indicated by arrow 52 in FIG. 3, and dislodging particles captured by the first and second filter media 24, 28. Moving to block 120, the method 100 includes diverting, with the second reverse control valve 78, pressurized air flow passing through the first filter media 52 to the environment and expelling particles dislodged from the first and second filter media 24, 28 out of the system 10 to the exterior environment, as indicated by arrow 56 in FIG. 3. Moving to block 122, in an alternative exemplary embodiment, the method 100 includes diverting, with the second reverse control valve 78, pressurized air flow passing through the first filter media 52 to the environment and the system 10 shakes and drops the dislodged particles inside a chamber surrounding the first and second filter media 24, 28.

A system 10 and method 100 of the present disclosure offers several advantages. These include filtering air to remove particles much smaller than is capable by existing systems, including viruses, to protect an individual 36 that is breathing such air. The system 10 and method 100 includes using a first feed pump 14 to push air through a filter membrane that a human would be unable to draw air through, allowing the use of filter membrane material that is suited to capture particles sized between 1 and 20 nanometers. Reversibility of the airflow through the first and second filter media 24, 28 allows the first and second filter media 24, 28 to be cleaned of particles previously captured, allowing the system 10 to self-clean. Usage of third and fourth filter media 62, 68 and a second air feed pump 58 downstream of the enclosed space 12 allows air expelled from an individual 36 or group of individuals to be filtered prior to being expelled to the environment 16. A system 10 of the present disclosure stops virus particles sized between 1 and 20 manometers from being breathed in by a user of the system 10 and stops a user of the system from expelling virus particles sized between 1 and 20 nanometers to the environment 16.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing filtered air to an enclosed space, comprising:
   a first air feed pump adapted to pull air from an exterior environment and push pressurized air through the system to the enclosed space;
   a power source adapted to provide electrical power to the first air feed pump;
   a first filter media positioned between the first air feed pump and the enclosed space, downstream of the first air feed pump, the first filter media adapted to provide coarse filtration of the pressurized air pumped from the first air feed pump through the first filter media;
   a second filter media positioned between the first filter media and the enclosed space, downstream of the first filter media, the second filter media adapted to provide fine filtration of the pressurized air pumped from the first filter media through the second filter media;
   a first control valve positioned between the first air feed pump and the first filter media, downstream of the first air feed pump, the first control valve being adapted to control the flow of pressurized air from the first air feed pump;

a first reversing control valve positioned between the second filter media and the enclosed space, a reverse air flow path extending between and interconnecting the first control valve to the first reversing control valve, and a second reverse control valve positioned between the first control valve and the first filter media, wherein:

the first control valve is selectively actuatable to divert pressurized air flow from the first air feed pump to the reverse air flow path;

the first reversing control valve is selectively actuatable to stop air flow to the enclosed space and divert air flow from the reverse air flow path through the second filter media and the first filter media; and the second reverse control valve is selectively actuatable to divert pressurized air flow passing through the first filter media to the environment; and wherein, when pressurized air flows through the first and second filter media from the reverse air flow path, the pressurized air dislodges particles captured by the first and second filter media and expels the particles dislodged from the first and second filter media out of the system to the exterior environment through the second reverse control valve.

2. The system of claim 1, wherein the first filter media is adapted to remove particles that are larger than approximately 5 microns from the pressurized air flowing through the first filter media.

3. The system of claim 2, wherein the second filter media is adapted to remove particles that are between approximately 1 nanometer and approximately 20 nanometers in size from the pressurized air flowing through the second filter media.

4. The system of claim 3, wherein the enclosed space is a facemask adapted to deliver air that has passed through the first filter media and the second filter media to an individual user.

5. The system of claim 4, wherein the power source is adapted to provide between approximately 20 and approximately 32 watts of power to the first air feed pump and the first air feed pump is adapted to provide air that is pressured to between approximately 1 psi and approximately 3 psi to the facemask at a flow rate of between approximately 30 liters per minute and approximately 60 liters per minute.

6. The system of claim 3, wherein the enclosed space is a vehicle compartment.

7. The system of claim 1, further including:

a second air feed pump adapted to pull air from the enclosed space and push pressurized air through the system to the exterior environment; and a third filter media positioned between the second air feed pump and the exterior environment, downstream of the second air feed pump, the third filter media adapted to provide fine filtration of the pressurized air pumped from the second air feed pump through the third filter media.

8. The system of claim 7, further including a second control valve positioned between the second air feed pump and the third filter media, downstream of the second air feed pump, the second control valve being adapted to control the flow of pressurized air from the second air feed pump.

9. The system of claim 8, wherein the third filter media is adapted to remove particles that are between approximately 1 nanometer and approximately 20 nanometers in size from the pressurized air flowing through the third filter media.

10. The system of claim 9, further including a fourth filter media positioned between the second air feed pump and the third filter media, downstream of the second air feed pump, the fourth filter media adapted to provide course filtration of the pressurized air pumped from the second air feed pump through the fourth filter media before the pressurized air passes through the third filter media.

11. The system of claim 10, wherein the fourth filter media is adapted to remove particles that are larger than 5 microns from the pressurized air flowing through the fourth filter media.

12. The system of claim 1, wherein the power source adapted to provide electrical power to the first air feed pump is a rechargeable battery pack, enabling the system to be portable.

13. The system of claim 1, further including a chamber surrounding the first and second filter media, wherein, when pressurized air flows through the first and second filter media from the reverse air flow path, the pressurized air dislodges particles captured by the first and second filter media and expels the particles dislodged from the first and second filter media into the chamber surrounding the first and second filter media.

14. A method of providing filtered air to an enclosed space, comprising:

providing, with a power source, electrical power to a first air feed pump;

pulling, with the first air feed pump, air from an exterior environment and pushing, with the first air feed pump, pressurized air to the enclosed space;

providing, with a first filter media positioned between the first air feed pump and the enclosed space, downstream of the first air feed pump, course filtration of the pressurized air pumped from the first air feed pump through the first filter media and removing, with the first filter media, particles that are larger than approximately 5 microns from the pressurized air;

providing, with a second filter media positioned between the first filter media and the enclosed space, downstream of the first filter media, fine filtration of the pressurized air pumped from the first filter media through the second filter media and removing, with the second filter media, particles that are between approximately 1 nanometer and approximately 20 nanometers in size from the pressurized air;

pulling, with a second air feed pump, air from the enclosed space and pushing, with the second air feed pump, pressurized air to the exterior environment; and providing, with a third filter media positioned between the second air feed pump and the exterior environment, downstream of the second air feed pump, fine filtration of the pressurized air pumped from the second air feed pump through the third filter media and removing, with the third filter media, particles that are between approximately 1 nanometer and approximately 20 nanometers in size from the pressurized air.

15. The method of claim 14, wherein the providing, with the power source, electrical power to the first air feed pump further includes providing, with the power source, between approximately 20 and approximately 32 watts of power to the first air feed pump; and the pushing, with the first air feed pump, pressurized air to the enclosed space further includes pushing, with the first air feed pump, air that is pressured to between approximately 1 psi and approximately 3 psi to the enclosed space at a flow rate of between approximately 30 liters per minute and approximately 60 liters per minute.

16. The method of claim 15, further including
providing, with a fourth filter media positioned between the second air feed pump and the third filter media, downstream of the second air feed pump, course filtration of the pressurized air pumped from the second air feed pump through the fourth filter media and removing, with the fourth filter media, particles that are larger than 5 microns from the pressurized air before the pressurized air passes through the third filter media.

17. The method of claim 16, wherein the system further includes a first reversing control valve positioned between the second filter media and the enclosed space, a reverse air flow path extending between and interconnecting the first control valve to the first reversing control valve, and a second reverse control valve positioned between the first control valve and the first filter media, the method further including:
diverting, with the first control valve, pressurized air flow from the first air feed pump to the reverse air flow path;
stopping, with the first reversing control valve, air flow to the enclosed space and diverting air flow from the reverse air flow path through the second filter media and the first filter media and dislodging particles captured by the first and second filter media; and
diverting, with the second reverse control valve, pressurized air flow passing through the first filter media to the environment and expelling particles dislodged from the first and second filter media out of the system to the exterior environment.

18. The method of claim 15, wherein the providing, with the power source, electrical power to the first air feed pump further includes providing, with a power source that is a rechargeable battery pack, between approximately 20 and approximately 32 watts of power to the first air feed pump.

19. A system for providing filtered air to an enclosed space, comprising:
a first air feed pump adapted to pull air from an exterior environment and push pressurized air through the system to the enclosed space;
a first control valve positioned between the first air feed pump and the first filter media, downstream of the first air feed pump, the control valve being adapted to control the flow of pressurized air from the first air feed pump;
a second air feed pump adapted to pull air from the enclosed space and push pressurized air through the system to the exterior environment;
a second control valve positioned between the second air feed pump and the exterior environment, downstream of the second air feed pump, the second control valve being adapted to control the flow of pressurized air from the second air feed pump;
a power source adapted to provide electrical power to the first and second air feed pumps;
a first filter media positioned between the first air feed pump and the enclosed space, downstream of the first air feed pump, the first filter media adapted to provide coarse filtration of the pressurized air pumped from the first air feed pump through the first filter media and remove particles that are larger than approximately 5 microns from the pressurized air flowing through the first filter media;
a second filter media positioned between the first filter media and the enclosed space, downstream of the first filter media, the second filter media adapted to provide fine filtration of the pressurized air pumped from the first filter media through the second filter media and remove particles that are between approximately 1 nanometer and approximately 20 nanometers in size from the pressurized air flowing through the second filter media;
a third filter media positioned between the second air feed pump and the exterior environment, downstream of the second air feed pump, the third filter media adapted to provide fine filtration of the pressurized air pumped from the second air feed pump through the third filter media and remove particles that are between approximately 1 nanometer and approximately 20 nanometers in size from the pressurized air flowing through the third filter media;
a fourth filter media positioned between the second air feed pump and the third filter media, downstream of the second air feed pump, the fourth filter media adapted to provide coarse filtration of the pressurized air pumped from the second air feed pump through the fourth filter media and remove particles that are larger than 5 microns from the pressurized air flowing through the fourth filter media before the pressurized air passes through the third filter media;
a first reversing control valve positioned between the second filter media and the enclosed space;
a reverse air flow path extending between and interconnecting the first control valve to the first reversing control valve; and
a second reverse control valve positioned between the first control valve and the first filter media;
wherein, the first control valve is selectively actuatable to divert pressurized air flow from the first air feed pump to the reverse air flow path, the first reversing control valve is selectively actuatable to stop air flow to the enclosed space and divert air flow from the reverse air flow path through the second filter media and the first filter media, and the second reverse control valve is selectively actuatable to divert pressurized air flow passing through the first filter media to the environment; and
wherein, when pressurized air flows through the first and second filter media from the reverse air flow path, the pressurized air dislodges particles captured by the first and second filter media and expels particles dislodged from the first and second filter media out of the system to the exterior environment through the second reverse control valve.

20. The system of claim 19, wherein:
the enclosed space is a facemask adapted to deliver air that has passed through the first filter media and the second filter media to an individual user;
the power source is adapted to provide between approximately 20 and approximately 32 watts of power to the first air feed pump; and
the first air feed pump is adapted to provide air that is pressured to between approximately 1 psi and approximately 3 psi to the facemask at a flow rate of between approximately 30 liters per minute and approximately 60 liters per minute.

* * * * *